(12) United States Patent
Ono et al.

(10) Patent No.: US 12,393,146 B2
(45) Date of Patent: Aug. 19, 2025

(54) FILM, MEMBER, TRANSFER DEVICE, FIXING DEVICE, AND IMAGE FORMING APPARATUS

(71) Applicant: FUJIFILM Business Innovation Corp., Tokyo (JP)

(72) Inventors: Masato Ono, Kanagawa (JP); Iori Nishimura, Kanagawa (JP); Jun Kimura, Kanagawa (JP); Hiroaki Tanaka, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/735,188

(22) Filed: Jun. 6, 2024

(65) Prior Publication Data

US 2025/0013180 A1     Jan. 9, 2025

(30) Foreign Application Priority Data

Jun. 30, 2023   (JP) .................................. 2023-108944

(51) Int. Cl.
*G03G 15/20*     (2006.01)
*G03G 15/16*     (2006.01)

(52) U.S. Cl.
CPC ......... *G03G 15/206* (2013.01); *G03G 15/162* (2013.01); *G03G 15/2017* (2013.01);
(Continued)

(58) Field of Classification Search
CPC ............. G03G 15/162; G03G 15/2017; G03G 15/2053; G03G 15/2057; G03G 15/206;
(Continued)

(56) References Cited

U.S. PATENT DOCUMENTS 9,606,478 B2      3/2017  Tsuji
2005/0019583 A1*  1/2005  Goto .................... G03G 7/0013
                                                  430/124.35
(Continued)

FOREIGN PATENT DOCUMENTS

JP          6305220           4/2018
JP          6801474          12/2020

OTHER PUBLICATIONS

N. TZ. Dintcheva et al., "Structure-properties relationships of polyhedral oligomeric silsesquioxane (POSS) filled PS nanocomposites", Express Polymer Letters, vol. 6, No. 7, Jan. 20, 2012, pp. 561-571.
(Continued)

*Primary Examiner* — Joseph S Wong
(74) *Attorney, Agent, or Firm* — JCIPRNET

(57) ABSTRACT

A film contains a resin and a siloxane compound having a structure A represented by Formula: $[RSiO_{1.5}]_n$ (provided that in the formula, R represents an organic group and n represents an integer of 2 or more), where at least one R among plural R's in the structure A is a group including an alkyl group and a difference in solubility parameter (SP value) between the resin and the structure A is 3.0 or less in terms of an absolute value, and surface free energy is 40 $mJ/m^2$ or less.

20 Claims, 4 Drawing Sheets

(52) U.S. Cl.
CPC ..... *G03G 15/2053* (2013.01); *G03G 15/2057* (2013.01); *G03G 2215/1623* (2013.01); *G03G 2215/20* (2013.01); *G03G 2215/2003* (2013.01); *G03G 2215/2009* (2013.01); *G03G 2215/2016* (2013.01); *G03G 2215/2048* (2013.01); *G03G 2215/2051* (2013.01)

(58) Field of Classification Search
CPC ....... G03G 2215/1623; G03G 2215/20; G03G 2215/2003; G03G 2215/2009; G03G 2215/2016; G03G 2215/2048; G03G 2215/2051
See application file for complete search history.

(56) References Cited

U.S. PATENT DOCUMENTS

| | | | | |
|---|---|---|---|---|
| 2007/0122216 | A1* | 5/2007 | Omata | G03G 15/205 399/329 |
| 2011/0223436 | A1 | 9/2011 | Wu et al. | |
| 2024/0317954 | A1* | 9/2024 | Kubo | C08J 7/0427 |

OTHER PUBLICATIONS

Dilek Turan et al., "Effects of POSS Particles on the Mechanical, Thermal, and Morphological Properties of PLA and Plasticised PLA", Journal of Applied Polymer Science, vol. 121, No. 2, Feb. 25, 2011, pp. 1067-1075.

Magdalena Lipińska, "The Effect of Various Polyhedral Oligomeric Silsesquioxanes on Viscoelastic, Thermal Properties and Crystallization of Poly(ε-caprolactone) Nanocomposites", Polymers, vol. 14, No. 23, Nov. 23, 2022, pp. 1-18.

Jianqing Zhao et al., "Polyhedral Oligomeric Silsesquioxane (POSS)-Modified Thermoplastic and Thermosetting Nanocomposites: A Review", Polymers & Polymer Composites, vol. 16, No. 8, Oct. 1, 2008, pp. 483-500.

David A Schiraldi et al., "Trnsparent Nanocomposites of Polyhedral Oligomeric Silsesquioxanes (POSS)", Polymer Preprints, American Chemical Society, US, vol. 45, No. 1, Jan. 1, 2004, pp. 642-643.

Hong-Un Kim et al., "Morphology and mechanical properties of PET by incorporation of amine-polyhedral oligomeric silsesquioxane", Composites Science and Technology, vol. 68, Issue 13, Oct. 2008, pp. 2739-2747.

Shen Su et al., "Uncompatibilized PBAT/PLA Blends: Manufacturability, Miscibility and Properties", Materials, vol. 13, No. 21, Oct. 31, 2020, pp. 1-17.

Henry W. Milliman et al., "Experimental Determination of Hansen Solubility Parameters for Select POSS and Polymer Compounds as a Guide to POSS-Polymer Interaction Potentials", Macromolecules, vol. 45, No. 4, Feb. 7, 2012, pp. 1931-1936.

C. Bordes et al., "Determination of poly(ε-caprolactone) solubility parameters: Application to solvent substitution in a microencapsulation process", International Journal of Pharmaceutics, vol. 383, Issues 1-2, Jan. 4, 2010, pp. 236-243.

Alamin Idris et al., "Effects of Phase Separation Behavior on Morphology and Performance of Polycarbonate Membranes", Membranes, vol. 7, No. 2, Apr. 5, 2017, pp. 1-18.

"Search Report of Europe Counterpart Application", issued on Nov. 26, 2024, p. 1-p. 17.

"Office Action of Europe Counterpart Application", issued on Jul. 11, 2025, p. 1-p. 6.

* cited by examiner

FILM, MEMBER, TRANSFER DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-108944 filed Jun. 30, 2023.

BACKGROUND

(i) Technical Field

The present invention relates to a film, a member, a transfer device, a fixing device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed.

For example, JP6801474B discloses "a water and oil repellent film including a resin layer which contains organosilsesquioxane containing silicone (excluding organosilsesquioxane having a T2m+6 (m≥1) structure) having no fluorine atom on a side chain group R1 binding to a silicon atom and a water and oil repellent layer which is laminated on the resin layer and contains organosilsesquioxane of a T2m+6 (m≥1) structure having a hydrocarbon group R2 binding to a silicon atom and in which at least a part of the organosilsesquioxane is exposed on a surface of the water and oil repellent layer, in which Hansen solubility parameters of the silicone consist of a dispersion parameter δD of 10 $MPa^{1/2}$ or more and 15 $MPa^{1/2}$ or less, a polarity parameter δP of 0 $MPa^{1/2}$ or more and 5 $MPa^{1/2}$ or less, and a hydrogen bonding parameter δH of 0 $MPa^{1/2}$ or more and 5 $MPa^{1/2}$ or less, and the organosilsesquioxane is octamethylsilsesquioxane".

JP6305220B discloses "an electrophotographic member having a substrate and a surface layer, in which the surface layer contains a binder resin having an acrylic skeleton and a modified silicone compound having a polyether group and a hydroxyl group in one molecule, and an n-hexadecane contact angle on the surface of the surface layer is 30° or more".

SUMMARY

Aspects of non-limiting embodiments of the present disclosure relate to a film that contains a resin and a siloxane compound having a structure A represented by formula: $[RSiO_{1.5}]_n$ (provided that in the formula, R represents an organic group and n represents an integer of 2 or more), in which at least one R among a plurality of R's in the structure A represents a group including an alkyl group and a difference in solubility parameter (SP value) between the resin and the structure A is more than 3.0 in terms of an absolute value, or a film excellent in maintainability of high oil repellency even in a case of being continuously used in a high temperature environment as compared with a film having a surface free energy more than 40 $mJ/m^2$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following aspects.

According to an aspect of the present disclosure, there is provided a film including a resin, and a siloxane compound having a structure A represented by Formula: $[RSiO_{1.5}]_n$ (provided that in the formula, R represents an organic group and n represents an integer of 2 or more), where at least one R among a plurality of R's in the structure A is a group including an alkyl group and a difference in solubility parameter (SP value) between the resin and the structure A is 3.0 or less in terms of an absolute value, in which surface free energy is 40 $mJ/m^2$ or less.

BRIEF DESCRIPTION OF THE DRAWINGS

Exemplary embodiment(s) of the present invention will be described in detail based on the following figures, wherein.

DETAILED DESCRIPTION

Figure 1:
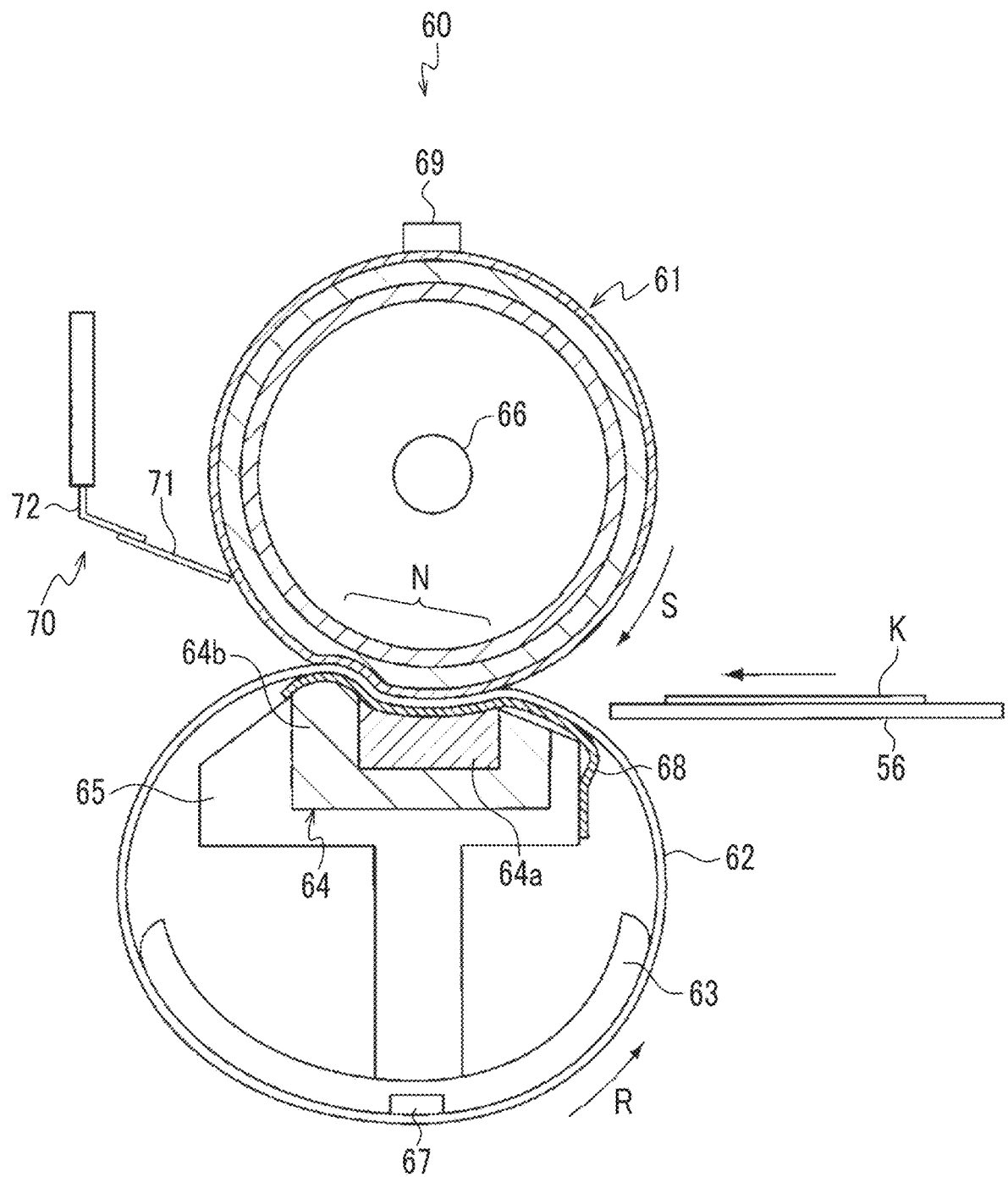
FIG. 1 is a schematic configuration view showing an example of a first exemplary embodiment of a fixing device according to the present exemplary embodiment.

Hereinafter, the present exemplary embodiment as an example of the present invention will be described. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value described in one range of numerical values may be replaced with the upper limit value or lower limit value of another range of numerical values described in stages. In addition, regarding the ranges of numerical values described in the present exemplary embodiment, the upper limit value or lower limit value of a range of numerical values may be replaced with values described in examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Film

A film according to the present exemplary embodiment includes a resin and a siloxane compound having a structure A represented by Formula: $[RSiO_{1.5}]_n$ (provided that in the formula, R represents an organic group and n represents an integer of 2 or more), where at least one R in the structure A is a group including an alkyl group and a difference in solubility parameter (SP value) between the resin and the structure A is 3.0 or less in terms of an absolute value (hereinafter, also referred to as a "siloxane compound SQ").

The film according to the present exemplary embodiment is a film excellent maintainability of high oil repellency even in a case of being continuously used in a high temperature environment by the above-described configuration. The reason is presumed as follows.

Dimethyl silicone is a compound having high oil repellency, and is a compound having a high dielectric constant as compared with a fluorine compound. Therefore, using the dimethyl silicone is beneficial in terms of strength stability in addition to imparting high oil repellency, with respect to a film, as compared with using a fluorine compound.

Here, in a case where the dimethyl silicone is added to the film, a methyl group is aligned on the film surface to impart high oil repellency.

However, in a case where the film containing dimethyl silicone is exposed to high heat, in which molecular movement is intensified, a main chain of dimethyl silicone is rotated, a methyl group moves and is buried in the resin, and oil repellency may be reduced.

On the other hand, the structure A of $[RSiO_{1.5}]$, in the siloxane compound SQ is a multidimensional structure having high skeletal strength. Therefore, in the siloxane compound SQ, heat resistance is high, molecular movement is reduced even in a high temperature environment, and thus the alkyl group which imparts oil repellency and is contained in at least one R in the structure A is difficult to move. As a result, the alignment of the alkyl group on the film surface is easily maintained, and the high oil repellency is difficult to be reduced. In order to impart sufficient high oil repellency, the surface free energy is 40 mJ/m$^2$ or less.

In addition, by setting the difference in solubility parameter (SP value) between the resin and the structure A of the siloxane compound SQ to 3.0 or less in terms of an absolute value, compatibility between the resin and the siloxane compound SQ is increased. As a result, the siloxane compound SQ exhibits a pseudo drawing effect on the resin, and the siloxane compound SQ is difficult to move. Therefore, the alignment of the alkyl group is easily maintained on the film surface, and the high oil repellency is less likely to be reduced even in a case where the film is repeatedly used in a high temperature and high humidity environment.

Therefore, it is presumed that the film according to the present exemplary embodiment is a film excellent maintainability of high oil repellency even in a case of being continuously used in a high temperature environment.

Hereinafter, the film according to the present exemplary embodiment will be described in detail.

The film according to the present exemplary embodiment contains a resin and a siloxane compound SQ, and a surface free energy of a surface of the film is 40 mJ/m$^2$ or less.

From the viewpoint of high oil repellency, the surface free energy of the surface of the film according to the present exemplary embodiment is, for example, preferably 35 mJ/m$^2$ or less and more preferably 30 mJ/m$^2$ or less.

The surface free energy of the surface of the film is measured by the following method.

According to the Owens-Wendt-Rabel-Kaelble (OWRK) method, water, diiodomethane, and N-dodecane, in which the surface free energy is known, are used, water is dropped onto the film to measure a contact angle of the water, diiodomethane is dropped onto the film to measure a contact angle of the diiodomethane, N-dodecane is dropped onto the film to measure a contact angle of the N-dodecane, and the surface free energy (mJ/m$^2$) is calculated.

Solubility Parameter

The difference in solubility parameter (SP value) between the resin and the structure A (that is, the siloxane compound SQ) is 3.0 or less in terms of the absolute value, but from the viewpoint of maintainability of the high oil repellency, for example, 1.5 or less is preferable.

In order to set the absolute value of the difference in solubility parameter (SP value) between the resin and the structure A to the above-described range, for example, a compatibility group with respect to the resin is preferably introduced into the structure A ($[RSiO_{1.5}]_n$) of the siloxane compound SQ. That is, among the plurality of R's present in the structure A, for example, it is preferable that at least one R is a group including an alkyl group and at least one R is a compatibility group with respect to the resin.

The solubility parameter (SP value) is a value calculated by the method of Fedors. Specifically, the solubility parameter (SP value) is, for example, in conformity with the description in Polym. Eng. Sci., vol. 14, p. 147 (1974), and the SP value is calculated by the following expression.

$$\text{SP value} = \sqrt{(Ev/v)} = \sqrt{(\Sigma \Delta ei / \Sigma \Delta vi)} \qquad \text{Expression:}$$

(In the expression, Ev: evaporation energy (cal/mol), v: molar volume (cm$^3$/mol), Δei: evaporation energy of each atom or atomic group, and Δvi: molar volume of each atom or atomic group)

The solubility parameter (SP value) is denoted by units of (cal/cm$^3$)$^{1/2}$, but the units are omitted according to the practice and the solubility parameter is expressed dimensionlessly.

Siloxane Compound SQ

The siloxane compound SQ is a compound having a structure A of Formula: $[RSiO_{1.5}]_n$ (provided that in the formula, R represents an organic group and n represents an integer of 2 or more), where at least one R in the structure A has a group including an alkyl group.

In the structure A, the organic group represented by R in the formula represents, for example, a hydroxyl group, a siloxy group, a hydrocarbon group, a hydrocarbon group in which one or a plurality of methylene groups are replaced with a carbonyl group, a hydrocarbon group in which one or a plurality of carbon atoms are replaced with a heteroatom (oxygen atom, nitrogen atom, or sulfur atom), or a group formed by a combination of these groups.

Examples of the siloxy group described as the organic group represented by R include a monoalkylsiloxy group, a dialkylsiloxy group, a trialkylsiloxy group, and the like, and for examples, a dialkylsiloxy group or a trialkylsiloxy group is preferable and a trialkylsiloxy group is more preferable.

Examples of the hydrocarbon group described as the organic group represented by R include an aliphatic hydrocarbon group and an aromatic hydrocarbon group.

Examples of the aliphatic hydrocarbon group include a linear, branched, or alicyclic saturated aliphatic hydrocarbon group, and a linear, branched, or alicyclic unsaturated aliphatic hydrocarbon group.

The aliphatic hydrocarbon group is, for example, preferably a hydrocarbon group having 1 or more and 20 or less carbon atoms, and more preferably a hydrocarbon group having 1 or more and 15 or less carbon atoms.

The aliphatic hydrocarbon group may be substituted with a substituent such as a halogen atom, a hydroxyl group, an amino group, and an aryl group.

Examples of the aromatic hydrocarbon group include a hydrocarbon group having 6 or more and 18 or less carbon atoms (for example, preferably 6 or more and 14 or less carbon atoms). Examples of the aromatic hydrocarbon group include a phenyl group, a naphthyl group, an anthracenyl group, and the like.

The aromatic hydrocarbon group may be substituted with a substituent such as a halogen atom, a hydroxyl group, an amino group, an alkyl group, and an alkoxy group.

The organic group represented by R may have a reactive group. Examples of the reactive group include a vinyl group, an allyl group, a styryl group, a maleimide group, an epoxy group, a (meth)acryloyl group, and the like.

A plurality of R's present in the structure A may be the same organic group or different organic groups.

However, among a plurality of R's present in the structure A, at least one R is a group including an alkyl group. Here, from the viewpoint of high oil repellency, the group containing an alkyl group is, for example, an alkyl group itself or a siloxy group containing an alkyl group. That is, at least one of the plurality of R's present in the structure A is, for example, preferably an alkyl group or a siloxy group containing an alkyl group.

The alkyl group is, for example, preferably an alkyl group having 1 or more to 9 or less carbon atoms and more preferably an alkyl group having 1 or more to 4 or less carbon atoms or an alkyl group having 1 carbon atom (that is, a methyl group). In order to set the surface free energy to 40 mJ/m$^2$ or less, the number of carbon atoms in the alkyl group is, for example, preferably 1 or more and 4 or less.

In addition, from the viewpoint of maintainability of the high oil repellency, for example, it is preferable that at least one R among a plurality of R's present in the structure A is a compatibility group with respect to the resin.

The compatibility group may also serve as the above-described "alkyl group provided as at least one among the plurality of R's in the structure A".

Here, the compatibility group with respect to the resin means a group which exhibits an interaction by hydrogen bonding action, ion interaction, dipole interaction, or the like with respect to a constitutional unit in part or in whole of the resin.

Specific examples of the compatibility group with respect to the resin include the following groups.

In a case where the resin is a silicone rubber, examples of the compatibility group include a hydroxyl group, a carboxyl group, an amide group, and the like.

In a case where the resin is a polycarbonate resin, examples of the compatibility group include an amide group, an alkyl group (a methyl group and the like), a carboxyl group, and the like.

In a case where the resin is a polyimide resin, examples of the compatibility group include an amide group, an alkyl group (a methyl group and the like), and the like.

In a case where the resin is a polyethylene terephthalate (PET) resin, examples of the compatibility group include a carboxyl group, an amide group, a hydroxyl group, and the like.

From the viewpoint of high oil repellency, the presence proportion of the group including an alkyl group in the siloxane compound SQ is, for example, preferably 10 mol % or more and 50 mol % or less and more preferably 25 mol % or more and 50 mol % or less with respect to the siloxane compound SQ.

From the viewpoint of maintainability of the high oil repellency, the presence proportion of the compatible group with respect to the resin is, for example, preferably 1 mol % or more and 10 mol % or less and more preferably 3 mol % or more and 10 mol % or less with respect to the siloxane compound SQ. In a case where the compatible group is a group other than an alkyl group, from the viewpoint of maintainability of the high oil repellency, the molar ratio (presence proportion of a group including an alkyl group/ presence proportion of the compatible group with respect to the resin) of the presence proportion of a group including an alkyl group to the presence proportion of the compatible group with respect to the resin is, for example, preferably 7/3 or more and 9/1 or less and more preferably 7/3 or more and 5/5 or less.

The measuring method of the presence proportion of the group including an alkyl group and the compatible group is as follows.

The present proportion is calculated from the peak height ratio corresponding to the group including alkyl group and the compatible group in the infrared (IR) spectroscopy measurement and X-ray photoelectron spectroscopy (XPS) measurement.

The siloxane compound SQ is a polymer compound called silsesquioxane, which has various skeletal structures.

The siloxane compound SQ may have, as a skeletal structure, any of a cage-type structure (a perfect cage-type structure or a cage-type structure), a ladder-type structure, or a random structure.

In the structure A, n in the formulae represents an integer of 2 or more, and from the viewpoint of the oil repellency in high temperature, for example, n preferably represents an integer of 8 or more and more preferably represents an integer of 8 or more and 10,000 or less.

Content of Siloxane Compound SQ

From the viewpoint of improving the oil repellency at a high temperature, the content of the siloxane compound with respect to the film is, for example, preferably 3% by volume or more, more preferably 6% by volume or more, and still more preferably 10% by volume or more.

Provided that, from the viewpoint of the bending resistance of the resin, the upper limit of the content of the siloxane compound with respect to the film is, for example, preferably 50% by volume or less and more preferably 30% by volume.

Binder Resin

Examples of the resin (hereinafter, also referred to as a "binder resin") include a polyimide resin (PI resin), a polyamide-imide resin (PAI resin), a polyether ketone resin (for example, an aromatic polyether ether ketone resin or the like), a polyphenylene sulfide resin (PPS resin), a polyetherimide resin (PEI resin), a polyester resin, a polystyrene resin, a polyamide resin, a polycarbonate resin, a silicone resin, polyethylene terephthalate resin (PET resin), mixed resin thereof, and the like.

In addition, as the resin, chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, or mixed rubber thereof can be also given as an example.

In addition, the binder resin may be selected, for example, according to the use of the film.

For example, in a case where the film is used in a single-layer intermediate transfer belt, as the binder resin, an imide-based resin (that is, a resin containing a constitutional unit having an imide bond, for example, preferably a polyimide resin), a polyether ether ketone (PEEK) resin, a silicone resin, or the like is preferable.

For example, in a case where the film is used in an outermost layer of a fixing belt, as the binder resin, an imide-based resin (that is, a resin containing a constitutional unit having an imide bond, for example, preferably a polyimide resin), a polyether ether ketone (PEEK) resin, a silicone resin, or the like is preferable.

For example, the film according to the present exemplary embodiment preferably contains a fluorine atom. Specifically, for example, as the binder resin, a resin containing no fluorine atom (specifically, a resin other than a fluororesin) is preferably applied.

Here, as a representative binder resin, polyimide will be described.

Examples of the polyimide resin include an imidized polyamic acid (polyimide resin precursor) which is a polymer of a tetracarboxylic dianhydride and a diamine compound.

Examples of the polyimide resin include a resin having a constitutional unit represented by General Formula (I).

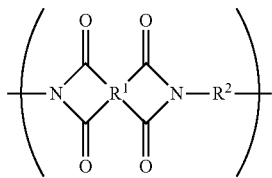

General Formula (I)

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these groups. Specific examples of the tetravalent organic group include a residue of a tetracarboxylic dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these groups. Specific examples of the divalent organic group include a residue of a diamine compound which will be described later.

Specifically, examples of the tetracarboxylic dianhydride used as a raw material of the polyimide resin include a pyromellitic dianhydride, a 3,3',4,4'-benzophenone tetracarboxylic dianhydride, a 3,3',4,4'-biphenyltetracarboxylic dianhydride, a 2,3,3',4-biphenyltetracarboxylic dianhydride, a 2,3,6,7-naphthalenetetracarboxylic dianhydride, a 1,2,5,6-naphthalenetetracarboxylic dianhydride, a 1,4,5,8-naphthalenetetracarboxylic dianhydride, a 2,2'-bis(3,4-dicarboxyphenyl)sulfonic dianhydride, a perylene-3,4,9,10-Tetracarboxylic dianhydride, a bis(3,4-dicarboxyphenyl) ether dianhydride, and an ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl) toluene, bis(p-β-amino-tert-butylphenyl) ether, bis(p-β-methyl-8-aminophenyl)benzene, bis-p-(1,1-dimethyl-5-amino-pentyl)benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis [4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

The content of the resin is the amount of a main component of the film. "Amount of a main component of the film" means the amount of the most abundant component among the components contained in the film.

Other Additives

Examples of other additives include known additives such as a conducting agent, a reinforcing agent, an antioxidant, a surfactant, and a heat-resistant antioxidant, depending on the use of the film.

As a representative additive, a conducting agent will be described.

Examples of the conducting agent include carbon black, metals (for example, aluminum, nickel, or the like), a metal oxide (for example, yttrium oxide, tin oxide, or the like), carbon nanotubes, an ion conducting substance (for example, potassium titanate, LiCl, or the like); and the like. Among these, for example, carbon black is preferable.

Each of these conducting agents may be used alone, or two or more of these conducting agents may be used in combination.

Examples of the carbon black include Ketjen black, oil furnace black, channel black (that is, gas black), acetylene black, and the like. As the carbon black, carbon black having undergone a surface treatment (hereinafter, also called "surface-treated carbon black") may be used.

The surface-treated carbon black is obtained by adding, for example, a carboxy group, a quinone group, a lactone group, a hydroxy group, or the like to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

Among these, for example, the conducting agent may be channel black, and particularly, may be acidic carbon black having a pH of 5.0 or less.

Examples of the acidic carbon black include carbon black whose surface is oxidatively treated, such as carbon black obtained by imparting a carboxyl group, a quinone group, a lactone group, a hydroxyl group, or the like to the surface.

From the viewpoint of improving transferability to embossed paper, the acidic carbon black is, for example, preferably carbon black having a pH of 4.5 or less, more preferably acidic carbon black having a pH of 4.0 or less, even more preferably acidic carbon black having a pH of 3.0 or less, particularly preferably acidic carbon black having a pH of 2.0 or more and 3.0 or less, and extremely preferably acidic carbon black having a pH of 2.0 or more and 2.8 or less.

The pH of the acidic carbon black is a value measured by a pH measuring method specified in JIS Z8802 (2011).

The content of the conducting agent with respect to the film is, for example, preferably 10% by mass or more and 50% by mass or less, more preferably 12% by mass or more and 40% by mass or less, even more preferably 14% by mass or more and 30% by mass or less, and particularly preferably 15% by mass or more and 20% by mass or less.

The peel strength of the surface of the film according to the present exemplary embodiment at 140° C. is, for example, preferably 24 kPa or less, more preferably 18 kPa or less, and still more preferably 15 kPa or less.

In a case where the peel strength of the surface of the film according to the present exemplary embodiment at 140° C. is in the above range, the film has high oil repellency even in a high temperature environment.

The peel strength of the surface of the film at 140° C. is measured as follows.

First, as a preparation in advance, P paper (manufactured by FUJIFILM Business Innovation Corp.) having an A4 size is prepared, and using a copy machine (ApeosPort-V C3375) manufactured by FUJIFILM Business Innovation Corp., a test paper on which a black 100% image is output on the entire surface is prepared. In addition, a square sample piece of 1 cm×1 cm is taken from the film to be measured.

Next, the surface of the sample piece is attached to a probe of a tack tester (TA-500, manufactured by UBM) heated to 140° C., the probe is approached to the test paper at a rate of 0.1 mm/s, the sample piece is pressed against the image surface of the test paper, and then held for 10 s under a pressing load of 3,900 gf, and the peel strength is measured in a case of being pulled up at a pulling-up rate of 10 mm/s.

Member

The member according to the present exemplary embodiment has the film according to the present exemplary embodiment as a layer constituting an outer peripheral surface.

The member according to the present exemplary embodiment may be either a single layer member of the film according to the present exemplary embodiment or a member including a substrate and the film according to the present exemplary embodiment provided on the substrate.

In a case where the member according to the present exemplary embodiment is used in an intermediate transfer body for an electrophotographic image forming apparatus, as such a member, a single layer body of the film according to the present exemplary embodiment or a laminate having the film as an outermost layer can be used. In the laminate, as a layer other than the film (for example, a substrate layer on which the film is to be provided, an elastic layer provided between the film and the substrate layer, or the like), a known layer provided on an intermediate transfer body can be used.

In a case where the member according to the present exemplary embodiment is used in a fixing member (such as a heating member, a pressure member, or a sliding member) for an electrophotographic image forming apparatus, as the member, a member having a substrate, an elastic layer provided on the substrate, and a release layer that is provided on the elastic layer and constituted of the film according to the present exemplary embodiment can be applied. As the substrate and the elastic layer, known substrate and elastic layers to be provide as a fixing member can be applied. Furthermore, the fixing member may have a known metal heating layer for electromagnetic induction heating, between the substrate and the elastic layer.

Examples of the member according to the present exemplary embodiment include a paper transport member for an electrophotographic image forming apparatus and the like, in addition to the intermediate transfer body and the fixing member.

Transfer Device

The transfer device according to the present exemplary embodiment includes an intermediate transfer body that is constituted of the member according to the present exemplary embodiment and has an outer peripheral surface to which a toner image is transferred, a primary transfer device in which a toner image formed on a surface of an image holder is primarily transferred to a surface of the intermediate transfer body, and a secondary transfer device in which the toner image transferred to the surface of the intermediate transfer body is secondarily transferred to a surface of a recording medium.

Primary Transfer Device

In the primary transfer device, the primary transfer member is arranged to face the image holder across the intermediate transfer belt. In the primary transfer device, a voltage with polarity opposite to charging polarity of a toner is applied to the intermediate transfer belt by the primary transfer member, thereby a toner image is primarily transferred to the outer peripheral surface of the intermediate transfer body.

Secondary Transfer Device

In the secondary transfer device, the secondary transfer member is arranged on a toner image-holding side of the intermediate transfer body. The secondary transfer device includes, for example, a secondary transfer member and a back surface member that is arranged on the side opposite to the toner image-holding side of the intermediate transfer body. In the secondary transfer device, the intermediate transfer body and the recording medium are interposed between the secondary transfer member and the back surface member, and a transfer electric field is formed. In this way, secondary transfer of the toner image formed on the intermediate transfer body to the recording medium is performed.

The secondary transfer member may be a secondary transfer roll or a secondary transfer belt. As the back surface member, for example, a back roll is used.

The transfer device according to the present exemplary embodiment may be a transfer device that transfers a toner image to the surface of a recording medium via a plurality of intermediate transfer bodies. That is, the transfer device may be, for example, a transfer device in which a toner image is primarily transferred to a first intermediate transfer body from an image holder, the toner image is secondarily transferred to a second intermediate transfer body from the first intermediate transfer body, and then the toner image is tertiarily transferred to a recording medium from the second intermediate transfer body.

As at least one of the plurality of intermediate transfer bodies of the transfer device, the intermediate transfer body constituted of the member according to the present exemplary embodiment is used.

Fixing Member

The fixing member according to the present exemplary embodiment includes a first rotary member and a second rotary member that is disposed to be in contact with an outer surface of the first rotary member, in which at least one of the first rotary member or the second rotary member is constituted of the member according to the present exemplary embodiment.

Hereinafter, regarding the fixing device according to the present exemplary embodiment, a fixing device including a heating roll and a pressure belt will be described as a first exemplary embodiment, a fixing device including a heating belt and a pressure roll will be described as a second exemplary embodiment, and an electromagnetic induction heating-type fixing device including a belt and a pressure roll will be described as a third exemplary embodiment.

The fixing device according to the present exemplary embodiment is not limited to the first to third exemplary embodiments, and may be a fixing device including a heating roll or a heating belt and a pressure belt.

Then, in the fixing device according to the present exemplary embodiment, the member according to the present exemplary embodiment may be applied to any of the heating roll, the heating belt, the pressure roll, or the pressure belt.

First Exemplary Embodiment of Fixing Device

The first exemplary embodiment of the fixing device will be described with reference to FIG. 1. FIG. 1 is a schematic view showing an example (that is, a fixing device 60) of a first exemplary embodiment of the fixing device.

As shown in FIG. 1, a fixing device 60 is configured, for example, with a heating roll 61 (an example of the first rotary member) that is driven to rotate, a pressure belt 62 (an example of the second rotary member), and a pressing pad 64 (an example of a pressing member) that presses the heating roll 61 via the pressure belt 62.

Regarding the pressing pad 64, for example, the pressure belt 62 and the heating roll 61 may be relatively pressed. Therefore, the pressure belt 62 may be pressed on the heating roll 61, or the heating roll 61 may be pressed on the pressure belt 62.

A halogen lamp 66 (an example of a heating device) is arranged on the inside of the heating roll 61. The heating device is not limited to the halogen lamp, and other heating members that generate heat may be used.

Meanwhile, for example, a thermosensitive element 69 is disposed in contact with a surface of the heating roll 61. The lighting of the halogen lamp 66 is controlled based on the temperature measurement value by the thermosensitive element 69, and the surface temperature of the heating roll 61 is kept at a target set temperature (for example, 150° C.).

The pressure belt 62 is rotatably supported by, for example, the pressing pad 64 disposed therein and a belt traveling guide 63. In a sandwiching region N (nip portion), the pressure belt is disposed to be pressed against the heating roll 61 by the pressing pad 64.

The pressing pad 64 is, for example, disposed in a state of being pressed against the heating roll 61 via the pressure belt 62 inside the pressure belt 62, and forms a sandwiching region N with the heating roll 61.

In the pressing pad 64, for example, a front sandwiching member 64a for securing a wide sandwiching region N is disposed on the inlet side of the sandwiching region N, and a peeling sandwiching member 64b for giving distortion to the heating roll 61 is disposed on the outlet side of the sandwiching region N.

In order to reduce sliding resistance between an inner peripheral surface of the pressure belt 62 and the pressing pad 64, for example, a sheet-like sliding member 68 is provided on a surface of the front sandwiching member 64a and the peeling sandwiching member 64b in contact with the pressure belt 62. The pressing pad 64 and the sliding member 68 are held by a metal holding member 65.

The sliding member 68 is provided, for example, so that a sliding surface thereof is in contact with the inner peripheral surface of the pressure belt 62, and is involved in holding and supplying an oil present between the sliding member 68 and the pressure belt 62.

For example, the belt traveling guide 63 is attached to the holding member 65, and the pressure belt 62 is configured to rotate.

The heating roll 61 rotates, for example, in the direction of the arrow S by a drive motor (not shown), and following the above rotation, the pressure belt 62 rotates in the direction of the arrow R opposite to the rotation direction of the heating roll 61. That is, for example, the heating roll 61 rotates clockwise in FIG. 1, while the pressure belt 62 rotates counterclockwise.

Then, paper K (an example of a recording medium) having an unfixed toner image is guided by, for example, a fixing inlet guide 56 and transported to the sandwiching region N. While the paper K is passing through the sandwiching region N, the unfixed toner image on the paper K is fixed by the pressure and heat acting on the sandwiching region N.

In the fixing device 60, for example, by the front sandwiching member 64a in the form of a recess conforming to the outer peripheral surface of the heating roll 61, a wider sandwiching region N is secured, compared to a configuration having no front sandwiching member 64a.

In addition, the fixing device 60 is configured, for example, with the peeling sandwiching member 64b that is arranged to protrude from the outer peripheral surface of the heating roll 61, such that the heating roll 61 is locally distorted much in the outlet region of the sandwiching region N.

In a case where the peeling sandwiching member 64b is disposed as above, for example, the paper K after fixing passes through the distortion formed locally large when passing through the peeling sandwiching region, and thus the paper K is easy to be peeled off from the heating roll 61.

As an auxiliary device for peeling, for example, a peeling member 70 is arranged on a downstream side of the sandwiching region N of the heating roll 61. The peeling member 70 is, for example, held by a holding member 72 in a state where a peeling claw 71 is close to the heating roll 61 in a direction facing the rotation direction of the heating roll 61 (counter direction).

Second Exemplary Embodiment of Fixing Device

Figure 2:
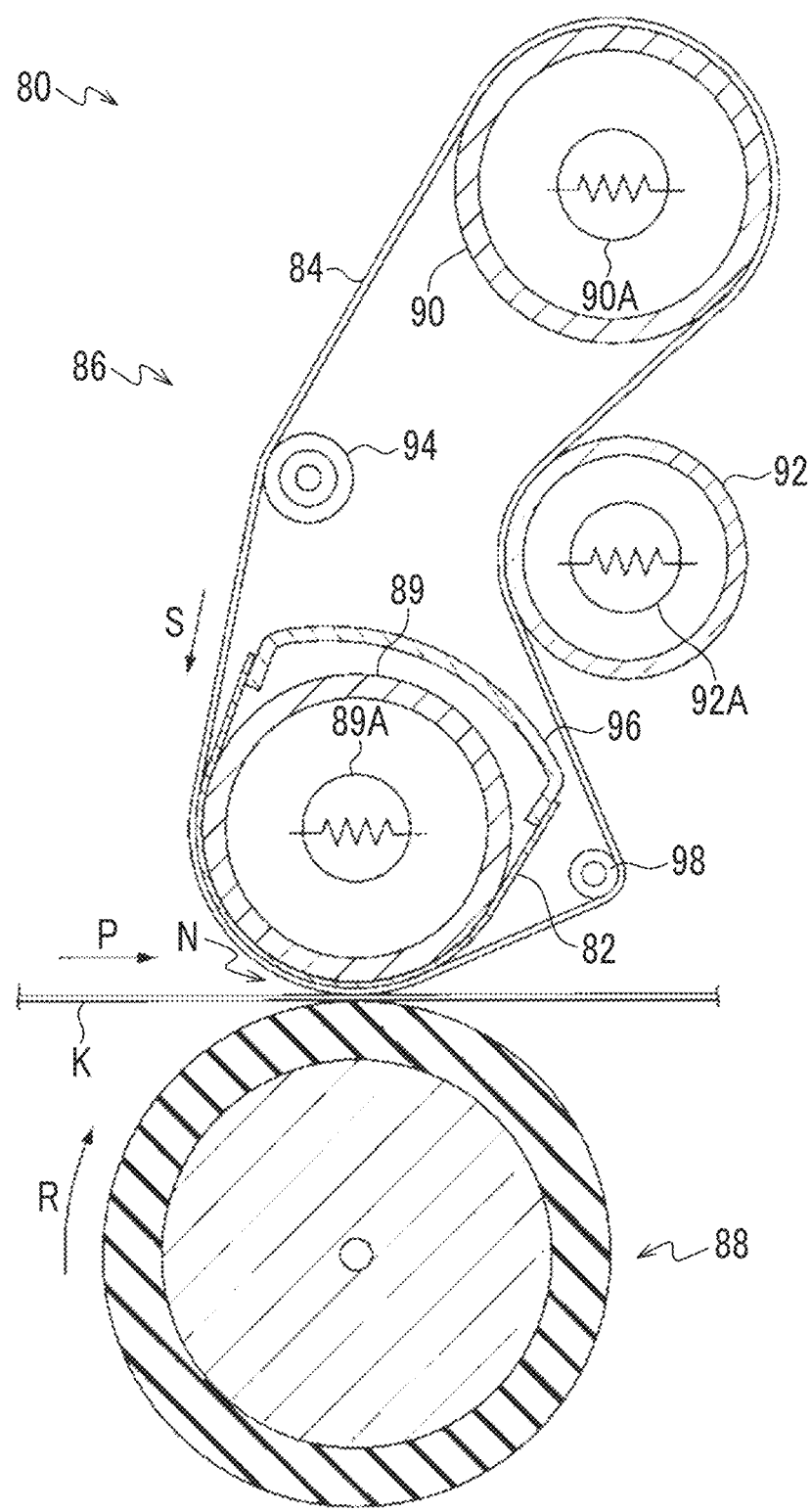
FIG. 2 is a schematic configuration view showing an example of a second exemplary embodiment of the fixing device according to the present exemplary embodiment.

The second exemplary embodiment of the fixing device will be described with reference to FIG. 2. FIG. 2 is a schematic view showing an example (that is, a fixing device 80) of a second exemplary embodiment of the fixing device.

As shown in FIG. 2, a fixing device 80 is configured, for example, with a fixing belt module 86 including a heating belt 84 (an example of the first rotary member) and a pressure roll 88 (an example of the second rotary member) arranged in a state of being pressed on a heating belt 84 (fixing belt module 86). For example, a sandwiching region N (nip portion) is formed in a contact portion between the heating belt 84 (fixing belt module 86) and the pressure roll 88. In the sandwiching region N, paper K (an example of a recording medium) is pressed and heated, and the toner image is fixed.

The fixing belt module 86 includes, for example, an endless heating belt 84, a heating and pressing roll 89 around which the heating belt 84 is wound on the side of the pressure roll 88 and which is driven to rotate by the rotational force of a motor (not shown in the drawing) and presses the heating belt 84 from an inner peripheral surface thereof toward the pressure roll 88, and a support roll 90 which supports the heating belt 84 from the inside at a position different from the heating and pressing roll 89.

The fixing belt module 86 is provided with, for example, a support roll 92 which is disposed outside the heating belt 84 and regulates the circulating path thereof, a posture correction roll 94 which corrects the posture of the heating belt 84 from the heating and pressing roll 89 to the support roll 90, and a support roll 98 which applies tension to the heating belt 84 from the inner peripheral surface on the downstream side of the sandwiching region N formed between the heating belt 84 and the pressure roll 88.

The fixing belt module 86 is provided, for example, so that a sheet-like sliding member 82 is interposed between the heating belt 84 and the heating and pressing roll 89.

The sliding member 82 is provided, for example, so that a sliding surface thereof is in contact with an inner peripheral surface of the heating belt 84, and is involved in holding and supplying an oil existing between the sliding member 82 and the heating belt 84.

Here, the sliding member 82 is provided, for example, in a state where both ends thereof are supported by a support member 96.

On the inside of the heating and pressing roll 89, for example, a halogen heater 89A (an example of a heating device) is provided.

The support roll 90 is, for example, a cylindrical roll formed of aluminum. A halogen heater 90A (an example of a heating device) is arranged on the inside of the support roll 90, such that the heating belt 84 is heated from the inner peripheral surface side.

At both ends of the support roll 90, for example, spring members (not shown) pressing the heating belt 84 outward are arranged.

The support roll 92 is, for example, a cylindrical roll formed of aluminum. A release layer consisting of a fluororesin having a thickness of 20 μm is formed on a surface of the support roll 92.

The release layer of the support roll 92 is formed, for example, to prevent a toner or paper dust from the outer peripheral surface of the heating belt 84 from accumulating on the support roll 92.

For example, a halogen heater 92A (an example of a heating device) is arranged on the inside of the support roll 92, such that the heating belt 84 is heated from the outer peripheral surface side.

That is, for example, the heating and pressing roll 89, the support roll 90, and the support roll 92 are configured to heat the heating belt 84.

The posture correction roll 94 is, for example, a columnar roll made of aluminum, and an end position measurement mechanism (not shown) for measuring the end position of the heating belt 84 is disposed in the vicinity of the posture correction roll 94.

In the posture correction roll 94, for example, an axial displacement mechanism (not shown) which displaces a contact position of the heating belt 84 in an axial direction according to the measurement result of the end position measurement mechanism is arranged, and the posture correction roll 94 is configured to control meandering of the heating belt 84.

The pressure roll 88 is provided, for example, such that the pressure roll 88 is rotatably supported and pressed on the site of the heating and pressing roll 89 around which the heating belt 84 is wound by a biasing device such as a spring not shown in the drawing. As a result, as the heating belt 84 (heating and pressing roll 89) of the fixing belt module 86 moves rotationally in the direction of the arrow S, the pressure roll 88 follows the heating belt 84 (heating and pressing roll 89) and moves rotationally in the direction of the arrow R.

The paper K having an unfixed toner image (not shown in the drawing) is transported in the direction of an arrow P and is guided to the sandwiching region N of the fixing device 80. While the paper K is passing through the sandwiching region N, the unfixed toner image on the paper K is fixed by the pressure and heat acting on the sandwiching region N.

For the fixing device 80, an embodiment has been described in which a halogen heater (halogen lamp) is used as an example of a plurality of heating devices. However, the fixing device is not limited thereto, and a radiation lamp heating element (a heating element generating radiation (such as infrared rays)) and a resistance heating element (a heating element generating Joule heat by passing an electric current through a resistor: for example, a heating element obtained by forming a film with a resistor on a ceramic substrate and baking the resultant) other than the halogen heater may be used.

Third Exemplary Embodiment of Fixing Device

Figure 3:
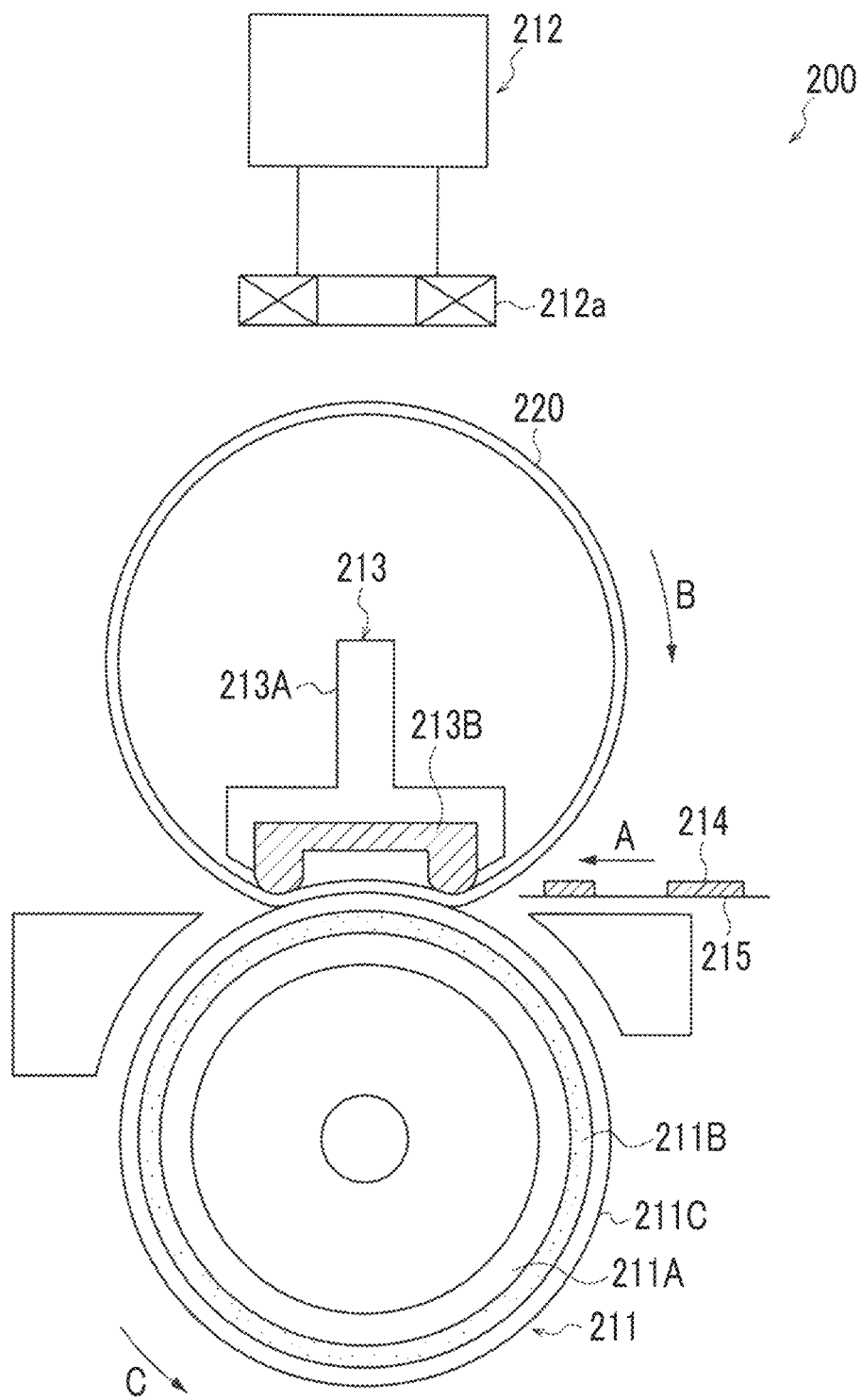
FIG. 3 is a schematic configuration view showing an example of a third exemplary embodiment of the fixing device according to the present exemplary embodiment.

The third exemplary embodiment of the fixing device will be described with reference to FIG. 3. FIG. 3 is a schematic view showing an example (that is, a fixing device 200) of a third exemplary embodiment of the fixing device.

As shown in FIG. 3, the fixing device 200 is an electromagnetic induction heating-type fixing device including a belt 220 having a metal layer.

In the fixing device 200, a pressure roll (pressure member) 211 is arranged such that pressure is applied to a part of the belt 220. From the viewpoint of efficiently performing fixing, a contact region (nip) is formed between the belt 220 and the pressure roll 211, and the belt 220 is curved to conform to the peripheral surface of the pressure roll 211. In addition, from the viewpoint of ensuring the peelability of a recording medium, a bent portion where the belt is bent is formed at the end of the contact region (nip).

The pressure roll 211 is configured with an elastic layer 211B made of silicone rubber or the like that is formed on the substrate 211A, and a release layer 211C formed of a fluorine-based compound that is formed on the elastic layer 211B.

On the inside of the belt 220, an opposing member 213 is disposed at a position facing the pressure roll 211. The opposing member 213 consists of a metal, a heat-resistant resin, heat-resistant rubber, or the like, and has a pad 213B that is in contact with the inner peripheral surface of the belt 220 to locally increase pressure, and a support 13A that supports the pad 213B. An electromagnetic induction heating device 212 having a built-in electromagnetic induction coil (excitation coil) 212a is provided at a position facing the pressure roll 211 (an example of a pressure member) across the belt 220. The electromagnetic induction heating device 212 applies an AC current to the electromagnetic induction coil, such that the generated magnetic field changes by an excitation circuit and an eddy current is generated in a metal layer (not shown in the drawing, for example, an electromagnetic induction metal layer) of the belt 220. The eddy current is converted into heat (Joule heat) by the electric resistance of a metal layer not shown in the drawing. As a result, the surface of the belt 220 generates heat.

The position of the electromagnetic induction heating device 212 is not limited to the position shown in FIG. 3. For example, the electromagnetic induction heating device 212 may be installed on the upstream side in the rotation direction B with respect to the contact region of the belt 220, or may be installed on the inside of the belt 220.

In the fixing device 200, by a driving device, a driving force is transmitted to the gear fixed to the end of the belt 220. As a result, the belt 220 performs self-rotation in the direction of the arrow B, and as the belt 220 rotates, the pressure roll 211 rotates in the opposite direction, that is, in the direction of the arrow C.

A recording medium 215 on which an unfixed toner image 214 is formed is passed through a contact region (nip) between the belt 220 and the pressure roll 211 in the fixing device 200 in the direction of the arrow A, and pressure is applied to the molten unfixed toner image 214. As a result, the unfixed toner image 214 is fixed to the recording medium 215.

Image Forming Apparatus

Next, the image forming apparatus according to the present exemplary embodiment will be described.

The image forming apparatus according to the present exemplary embodiment includes an image holder, a charging device that charges a surface of the image holder, an electrostatic latent image forming device that forms an electrostatic latent image on the charged surface of the image holder, a developing device that contains a developer containing a toner and develops the electrostatic latent image formed on the surface of the image holder with the developer to form a toner image, a transfer device that transfers the toner image to a surface of a recording medium, and the fixing device that fixes the toner image to the surface of the recording medium.

As the transfer device, the transfer device according to the present exemplary embodiment described above is applied.

In addition, as the fixing device, the fixing device according to the present exemplary embodiment is applied.

In the image forming apparatus according to the present exemplary embodiment, each of the transfer device and the fixing device may be made into a cartridge such that the transfer device and the fixing device are detachable from an image forming apparatus. That is, the image forming apparatus according to the present exemplary embodiment may include the transfer device according to the present exemplary embodiment and the fixing device according to the present exemplary embodiment respectively, as a device configuring a process cartridge.

Hereinafter, the image forming apparatus according to the present exemplary embodiment will be described with reference to a drawing.

Figure 4:
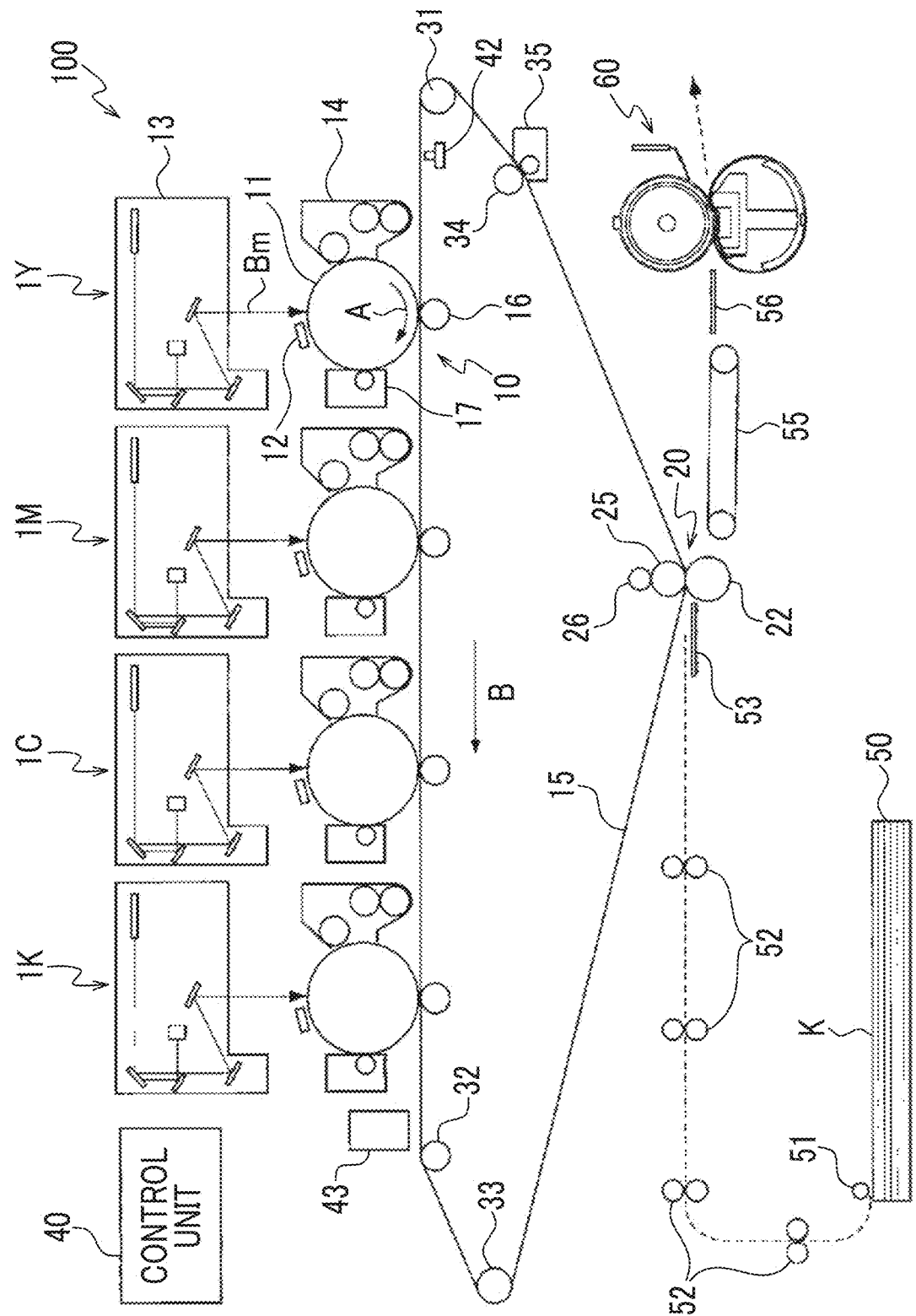
FIG. 4 is a schematic configuration view showing an example of an image forming apparatus according to the present exemplary embodiment.

FIG. 4 is a schematic configuration view showing the configuration of the image forming apparatus according to the present exemplary embodiment.

As shown in FIG. 4, an image forming apparatus 100 according to the present exemplary embodiment is, for example, an intermediate transfer-type image forming apparatus that is generally called a tandem type, and includes a plurality of image forming units 1Y, 1M, 1C, and 1K in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control unit 40 that controls the operation of each device (each portion).

Each of the image forming units 1Y, 1M, 1C, and 1K of the image forming apparatus 100 includes a photoreceptor 11 that rotates in the direction of an arrow A, as an example of an image holder that holds a toner image formed on the surface.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in Figure, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly disposed in order of yellow (Y), magenta (M), cyan (C), and black (K) from the upstream side of the intermediate transfer belt 15.

The intermediate transfer belt 15 which is an intermediate transfer body is configured with a film-shaped pressure belt including a base layer that is a resin such as polyimide or polyamide and containing an appropriate amount of an antistatic agent such as carbon black. Then, the intermediate transfer belt 15 is configured to have a volume resistivity of $10^6$ Ωcm or more and $10^{14}$ Ωcm or less and has a thickness of about, for example, 0.1 mm.

By various rolls, the intermediate transfer belt 15 is driven to circulate (rotate) in a direction B shown in FIG. 4 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a support roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a cleaning back roll 34 that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is configured with a core and a sponge layer as an elastic layer fixed around the core. The core is a cylindrical rod constituted of a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

Then, the primary transfer roll 16 is arranged to be pressed on the photoreceptor 11 with the intermediate transfer belt 15 interposed therebetween, and is configured such that a voltage (primary transfer bias) with an opposite polarity to a charging polarity (minus polarity and the same applies below) of the toner is applied to the primary transfer roll 16. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 is configured to include the back roll 25 and a secondary transfer roll 22 that is arranged on a toner image-holding surface side of the intermediate transfer belt 15.

The surface of the back roll 25 is configured with a tube of blended rubber of EPDM and NBR in which carbon is dispersed, and the inside of the back roll 25 is configured with EPDM rubber. Then, the back roll 25 is formed such that the surface resistivity thereof is $10^7 \Omega/\square$ or more and $10^{10} \Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

The secondary transfer roll 22 is configured with a core and a sponge layer as an elastic layer fixed around the core. The core is a cylindrical rod constituted of a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt cleaner 35 separable from the intermediate transfer belt 15 is provided which removes the residual toner or paper powder on the intermediate transfer belt 15 remaining after the secondary transfer and cleans the surface of the intermediate transfer belt 15.

The intermediate transfer belt 15, the primary transfer portion 10 (primary transfer roll 16), and the secondary transfer portion 20 (secondary transfer roll 22) correspond to an example of the transfer device.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control unit 40 based on the recognition of the reference signal.

On the downstream side of the black image forming unit 1K, an image density sensor 43 for adjusting image quality is arranged.

The image forming apparatus according to the present exemplary embodiment includes, as a transport device for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing inlet guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport device, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an output portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt cleaner 35.

Hitherto, the present exemplary embodiment has been described. However, the present exemplary embodiment is not limited to the above exemplary embodiments, and various modifications, changes, and ameliorations can be added thereto.

EXAMPLES

Hereinafter, the present invention will be more specifically described with reference to examples. However, the present invention is not limited to the following examples.

Examples 1 and 2, Examples 8 and 9: Examples of Resin as Silicone Rubber

A coating liquid is prepared by adding the siloxane compound of the type shown in Table 1 to a liquid silicone rubber (X34-2086, manufactured by Shin-Etsu Chemical Co., Ltd., ASK-C; 52°) such that the addition amount in the film is the amount shown in Table 1.

The obtained coating liquid is applied onto a metal plate, and vulcanized to obtain a film made of silicone rubber (SR).

Example 3 and Comparative Examples 3 and 4: Examples of Resin as Polycarbonate Resin The siloxane compound of the type shown in Table 1 is weighed such that the final addition amount in the film is the amount shown in Table 1, and dispersed in tetrahydrofuran (THF, FUJIFILM Wako Pure Chemical Corporation) as a solvent by performing stirring with a stirring bar, thereby obtaining a siloxane compound dispersion liquid. At this time, the THF is weighed such that the solid content of the resin, the siloxane compound, and the THF, which will be described later, is 15% by mass. Thereafter, polycarbonate resin (TEIJIN, TS-2040) as a resin is weighed to the siloxane compound dispersion liquid such that the content of the additive in Table 1 is reached, and the mixture is stirred with a stirring bar to obtain a coating liquid. Thereafter, the coating liquid is applied onto a metal plate, and then naturally dried and vacuum-dried to obtain a film made of a polycarbonate resin (PC).

Example 5 and Comparative Examples 1 and 2: Examples of Resin as Polyimide Resin A coating liquid is prepared by adding the siloxane compound of the type shown in Table 1 to a 1,3-dimethyl-2-imidazolidinone (DMI) solution (content of the resin of 20% by mass) of a polyimide precursor consisting of 3,3',4,4'-biphenyltetracarboxylic acid dianhydride (BPDA) and p-phenylenediamine (PDA) such that the addition amount in the film is the amount shown in Table 1.

The obtained coating liquid is applied onto a metal plate, and vulcanized to obtain a film made of a polyimide resin (PI).

Examples 4, 6, and 7: Examples of Resin as Polyethylene Terephthalate Resin

A film is obtained in the same manner as in Example 1, except that the resin is a polyethylene terephthalate resin (manufactured by Sigma-Aldrich Co. LLC, product 429252) and the addition amount of the siloxane compound is changed (see Table 1).

Evaluation

Solubility Parameter

According to the above-described method, a difference (absolute value) in solubility parameters between the resin and the structure A of the siloxane compound SQ (referred to as "Difference in SP value between resin and SQ" in the table) is measured.

Surface Free Energy

According to the above-described method, the surface free energy (referred to as "Surface free E" in the tables) of the surface of the film of each example is measured.

Peel Strength

Initial Stage

According to the above-described method, the peel strength of the surface of the film of each example at 140° C. is measured.

After Use

The film of each example is attached to a heating roll heated to 140° C., and rotated 30,000 times while rubbing against an opposing roll pressed with a load of 100 N to perform an acceleration test of continuous use in a high temperature environment.

Thereafter, according to the above-described method, the peel strength of the surface of the film of each example at 140° C. is measured.

The abbreviations shown in Table 1 are as follows.

SQ1: a siloxane compound SQ in which at least one R is a $C_9H_{17}$ group and at least one R is a compatible group (hydroxyl group) in the plurality of R's present in structure A, in structure A of $[RSiO_{1.5}]_n$, (specific compound name PSS-Trisilanol-isooctyl substituted: 560391 of Sigma-Aldrich Co. LLC)

SQ2: a siloxane compound SQ in which at least one R is a $C_9H_{17}$ group and at least one R is a compatible group (carboxyl group) in the plurality of R's present in structure A, in structure A of $[RSiO_{1.5}]_n$, (specific compound name PSS-Trisilanol-isooctyl substituted: substituted the hydroxyl group of 560391 of Sigma-Aldrich Co. LLC with a carboxyl group)

SQ3: a siloxane compound SQ in which at least one R is a methyl group and at least one R is a compatible group (amide group) in the plurality of R's present in structure A, in structure A of $[RSiO_{1.5}]_n$ (specific compound name PSS-Trisilanol-isooctyl substituted: substituted the hydroxyl group of 560391 of Sigma-Aldrich Co. LLC with an amide group and the $C_9H_{17}$ group with a methyl group)

SQ4: a siloxane compound SQ in which at least one R is a methyl group among a plurality of R's present in the structure A and a compatible group is not provided, in structure A of $[RSiO_{1.5}]_n$ (specific compound name PSS-octamethyl substituted: 526835 of Sigma-Aldrich Co. LLC)

TABLE 1

| Example | Resin | Additive | Content of additive [% by volume] | Difference in SP between resin and SQ | Surface free E [mJ/m$^2$] | Peel strength [kPa] Initial stage | Peel strength [kPa] After use |
|---|---|---|---|---|---|---|---|
| Example 1 | SR | SQ1 | 7 | 1.4 | 33 | 14 | 18 |
| Example 2 | SR | SQ2 | 7 | 1 | 33 | 14 | 14 |
| Example 3 | PC | SQ2 | 5 | 3 | 36 | 16 | 21 |
| Example 4 | PET | SQ1 | 3 | 2.9 | 39 | 20 | 22 |
| Example 5 | PI | SQ3 | 5 | 2.1 | 37 | 18 | 20 |
| Example 6 | PET | SQ1 | 5 | 2.9 | 37 | 18 | 21 |
| Example 7 | PET | SQ1 | 3 | 2.9 | 40 | 22 | 24 |
| Example 8 | SR | SQ1 | 6 | 1.4 | 35 | 15 | 16 |
| Example 9 | SR | SQ3 | 6 | 1.5 | 34 | 15 | 17 |
| Comparative Example 1 | PI | SQ3 | 2 | 2.1 | 41 | 25 | 25 |
| Comparative Example 2 | PI | SQ4 | 4 | 5.06 | 38 | 19 | 28 |
| Comparative Example 3 | PC | SQ2 | 2 | 3 | 42 | 27 | 29 |
| Comparative Example 4 | PC | SQ4 | 4 | 4.06 | 38 | 20 | 27 |

From the above results, the film of the present example has been found to be a film excellent in maintainability of high oil repellency even in a case of being continuously used in a high temperature environment, as compared with the films of the comparative examples.

Then, the film of the present example has been found to be able to impart the high oil repellency to the outer peripheral surface of the member even in a high temperature environment, as compared with the films of the comparative examples, by applying the film to the layer constituting the outer peripheral surface of the member.

The present exemplary embodiment includes the following aspects.

(((1)))

A film comprising:

a resin; and a siloxane compound having a structure A represented by Formula: $[RSiO_{1.5}]_n$ (provided that in the formula, R represents an organic group and n represents an integer of 2 or more), where at least one R among a plurality of R's in the structure A is a group including an alkyl group and a difference in solubility parameter (SP value) between the resin and the structure A is 3.0 or less in terms of an absolute value, wherein surface free energy is 40 mJ/m$^2$ or less.

(((2)))

The film according to (((1))), wherein the difference in solubility parameter (SP value) between the resin and the structure A is 1.5 or less in terms of an absolute value, and the surface free energy is 35 mJ/m$^2$ or less.

(((3)))

The film according to (((1))) or (((2))), wherein a content of the siloxane compound with respect to the film is 3% by volume or more.

(((4)))

The film according to (((3))), wherein the content of the siloxane compound with respect to the film is 6% by volume or more.

(((5)))

The film according to any one of (((1))) to (((4))), wherein a peel strength of a surface of the film at 140° C. is 24 kPa or less.

(((6)))

The film according to (((5))), wherein the peel strength of the surface of the film at 140° C. is 18 kPa or less.

(((7)))

A member comprising:

the film according to any one of (((1))) to (((6))) as a layer constituting an outer surface of the member.

(((8)))

A fixing device comprising:

a first rotary member; and a second rotary member that is disposed in contact with an outer surface of the first rotary member, wherein at least one of the first rotary member or the second rotary member is constituted of the member according to (((7))).

(((9)))

An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image;

a transfer device that transfers the toner image onto a surface of a recording medium; and the fixing device according to (((8))) that fixes the toner image on the surface of the recording medium.

(((10)))

A transfer device comprising:

an intermediate transfer body that is constituted of the member according to (((7))) and has an outer peripheral surface to which a toner image is transferred;

a primary transfer device in which a toner image formed on a surface of an image holder is primarily transferred to a surface of the intermediate transfer body; and a secondary transfer device in which the toner image transferred to the surface of the intermediate transfer body is secondarily transferred to a surface of a recording medium.

(((11)))

An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image;

the transfer device according to (((10))) that transfers the toner image onto a surface of a recording medium; and a fixing device that fixes the toner image on the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A film comprising:

a resin; and a siloxane compound having a structure A represented by Formula: $[RSiO_{1.5}]_n$ (provided that in the formula, R represents an organic group and n represents an integer of 2 or more), where at least one R among a plurality of R's in the structure A is a group including an alkyl group and a difference in solubility parameter (SP value) between the resin and the structure A is 3.0 or less in terms of an absolute value, wherein surface free energy is 40 $mJ/m^2$ or less.

2. The film according to claim 1, wherein the difference in solubility parameter (SP value) between the resin and the structure A is 1.5 or less in terms of an absolute value, and the surface free energy is 35 $mJ/m^2$ or less.

3. The film according to claim 1, wherein a content of the siloxane compound with respect to the film is 3% by volume or more.

4. The film according to claim 3, wherein the content of the siloxane compound with respect to the film is 6% by volume or more.

5. The film according to claim 1, wherein a peel strength of a surface of the film at 140° C. is 24 kPa or less.

6. The film according to claim 5, wherein the peel strength of the surface of the film at 140° C. is 18 kPa or less.

7. A member comprising:

the film according to claim 1 as a layer constituting an outer surface of the member.

8. A member comprising:

the film according to claim 2 as a layer constituting an outer surface of the member.

9. A member comprising:

the film according to claim 3 as a layer constituting an outer surface of the member.

10. A member comprising:

the film according to claim 4 as a layer constituting an outer surface of the member.

11. A member comprising:

the film according to claim 5 as a layer constituting an outer surface of the member.

12. A member comprising:

the film according to claim 6 as a layer constituting an outer surface of the member.

13. A fixing device comprising:

a first rotary member; and a second rotary member that is disposed to be in contact with an outer surface of the first rotary member, wherein at least one of the first rotary member or the second rotary member is constituted of the member according to claim 7.

14. A fixing device comprising:

a first rotary member; and a second rotary member that is disposed to be in contact with an outer surface of the first rotary member, wherein at least one of the first rotary member or the second rotary member is constituted of the member according to claim 8.

15. A fixing device comprising:

a first rotary member; and a second rotary member that is disposed to be in contact with an outer surface of the first rotary member, wherein at least one of the first rotary member or the second rotary member is constituted of the member according to claim 9.

16. A fixing device comprising:

a first rotary member; and a second rotary member that is disposed to be in contact with an outer surface of the first rotary member, wherein at least one of the first rotary member or the second rotary member is constituted of the member according to claim 10.

17. A fixing device comprising:

a first rotary member; and a second rotary member that is disposed to be in contact with an outer surface of the first rotary member, wherein at least one of the first rotary member or the second rotary member is constituted of the member according to claim 11.

18. An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image;

a transfer device that transfers the toner image onto a surface of a recording medium; and the fixing device according to claim 13 that fixes the toner image on a surface of a recording medium.

19. A transfer device comprising:

an intermediate transfer body that is constituted of the member according to claim 7 and has an outer peripheral surface to which a toner image is transferred;

a primary transfer device in which a toner image formed on a surface of an image holder is primarily transferred to a surface of the intermediate transfer body; and a secondary transfer device in which the toner image transferred to the surface of the intermediate transfer body is secondarily transferred to a surface of a recording medium.

20. An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image;

the transfer device according to claim 19 that transfers the toner image onto a surface of a recording medium; and a fixing device that fixes the toner image on the surface of the recording medium.

* * * * *